(12) United States Patent
Sumbul et al.

(10) Patent No.: US 11,726,950 B2
(45) Date of Patent: Aug. 15, 2023

(54) COMPUTE NEAR MEMORY CONVOLUTION ACCELERATOR

(71) Applicant: Intel Corporation, Santa Clara, CA (US)

(72) Inventors: Huseyin Ekin Sumbul, Portland, OR (US); Gregory K. Chen, Portland, OR (US); Phil Knag, Hillsboro, OR (US); Raghavan Kumar, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 16/586,975

(22) Filed: Sep. 28, 2019

(65) Prior Publication Data

US 2020/0034148 A1    Jan. 30, 2020

(51) Int. Cl.
*G06F 15/80* (2006.01)
*G06F 17/15* (2006.01)
*G06N 3/063* (2023.01)

(52) U.S. Cl.
CPC ........ *G06F 15/8046* (2013.01); *G06F 17/153* (2013.01); *G06N 3/063* (2013.01)

(58) Field of Classification Search
CPC ............. G06F 7/5443; G06F 2015/763; G06F 15/8046; G06F 17/153; G06N 3/063
See application file for complete search history.

(56) References Cited

U.S. PATENT DOCUMENTS

| | | | |
|---|---|---|---|
| 11,120,328 B1* | 9/2021 | Nair | G06F 17/16 |
| 2018/0032857 A1 | 2/2018 | Lele et al. | |
| 2019/0079764 A1* | 3/2019 | Diamond | G06F 9/30036 |
| 2019/0311243 A1* | 10/2019 | Whatmough | G06N 3/04 |
| 2020/0167405 A1* | 5/2020 | Suk | G06T 1/20 |
| 2021/0182025 A1* | 6/2021 | Shafiee Ardestani | |
| | | | G06N 3/0454 |

OTHER PUBLICATIONS

Chen, et al., "EYERISS: An Energy-Efficient Reconfigurable Accelerator for Deep Convolutional Neural Networks," 2016 IEEE International Solid-State Circuits Conference, Feb. 2, 2016, 3 pages.

\* cited by examiner

*Primary Examiner* — David J. Huisman
(74) *Attorney, Agent, or Firm* — Compass IP Law PC

(57) ABSTRACT

A compute near memory (CNM) convolution accelerator enables a convolutional neural network (CNN) to use dedicated acceleration to achieve efficient in-place convolution operations with less impact on memory and energy consumption. A 2D convolution operation is reformulated as 1D row-wise convolution. The 1D row-wise convolution enables the CNM convolution accelerator to process input activations row-by-row, while using the weights one-by-one. Lightweight access circuits provide the ability to stream both weights and input rows as vectors to MAC units, which in turn enables modules of the CNM convolution accelerator to implement convolution for both [1×1] and chosen [n×n] sized filters.

8 Claims, 11 Drawing Sheets

FIG. 3A
FIG. 3B

COMPUTE NEAR MEMORY CONVOLUTION ACCELERATOR

FIELD

The descriptions are generally related to computer architectures for deep learning, and in particular to accelerator circuits for convolutional neural networks.

BACKGROUND

Convolutional neural networks (CNNs) are a fundamental component of image and video processing for applications ranging from self-driving autonomous cars to security and surveillance. A CNN is initially trained with labeled data to produce a model expressed as a set of weights. The CNN uses the model/weights to infer an outcome from new input data. The CNN's capacity to infer outcomes is useful for computer vision tasks such as image classification, object detection and semantic segmentation. CNNs can also be used for speech recognition, natural language processing and other applications involving machine learning and artificial intelligence.

A CNN is composed of layers, the majority of which are convolved to produce an output layer used in inference tasks. The convolution layers are mathematically represented as matrices (and/or vectors) and convolved using multiplication or matrix-vector dot product operations.

For the most common proprietary CNNs, such as Microsoft's residual connections network model (ResNet) and Google's InceptionNet model (or GoogleNet), processing a convolution layer is typically based on performing convolution operations using small [1×1] and [3×3] weight matrices (also referred to as a filter or a kernel) on larger matrices that represent multiple input channels of image or video data, referred to as input activations. The input activations are processed in batches against weights previously generated during CNN training with known labeled data, e.g., sample image or video data. The number of convolution operations during training and inference of a CNN can be extremely large, on the order billions and quintillions of operations.

Because the amount of data and number of convolution operations is large, processing convolution layers is the most time-consuming, and therefore energy critical, step for both CNN training and inference. A typical CNN is memory and computing intensive, demanding high memory bandwidth to process the large amount of data as well as high compute efficiency to achieve good performance. Accelerating data-intensive convolution operations in an energy-efficient way while keeping all available compute units fully utilized is one of the most critical goals for implementing a successful CNN.

BRIEF DESCRIPTION OF THE DRAWINGS

The described embodiments are illustrated by way of example and not limitation in the figures of the accompanying drawings, in which like references indicate similar elements and in which:

FIGS. 3A-3B are schematic block diagrams and expressions illustrating row-wise convolution operations in accordance with various examples described herein;

Figure 1:
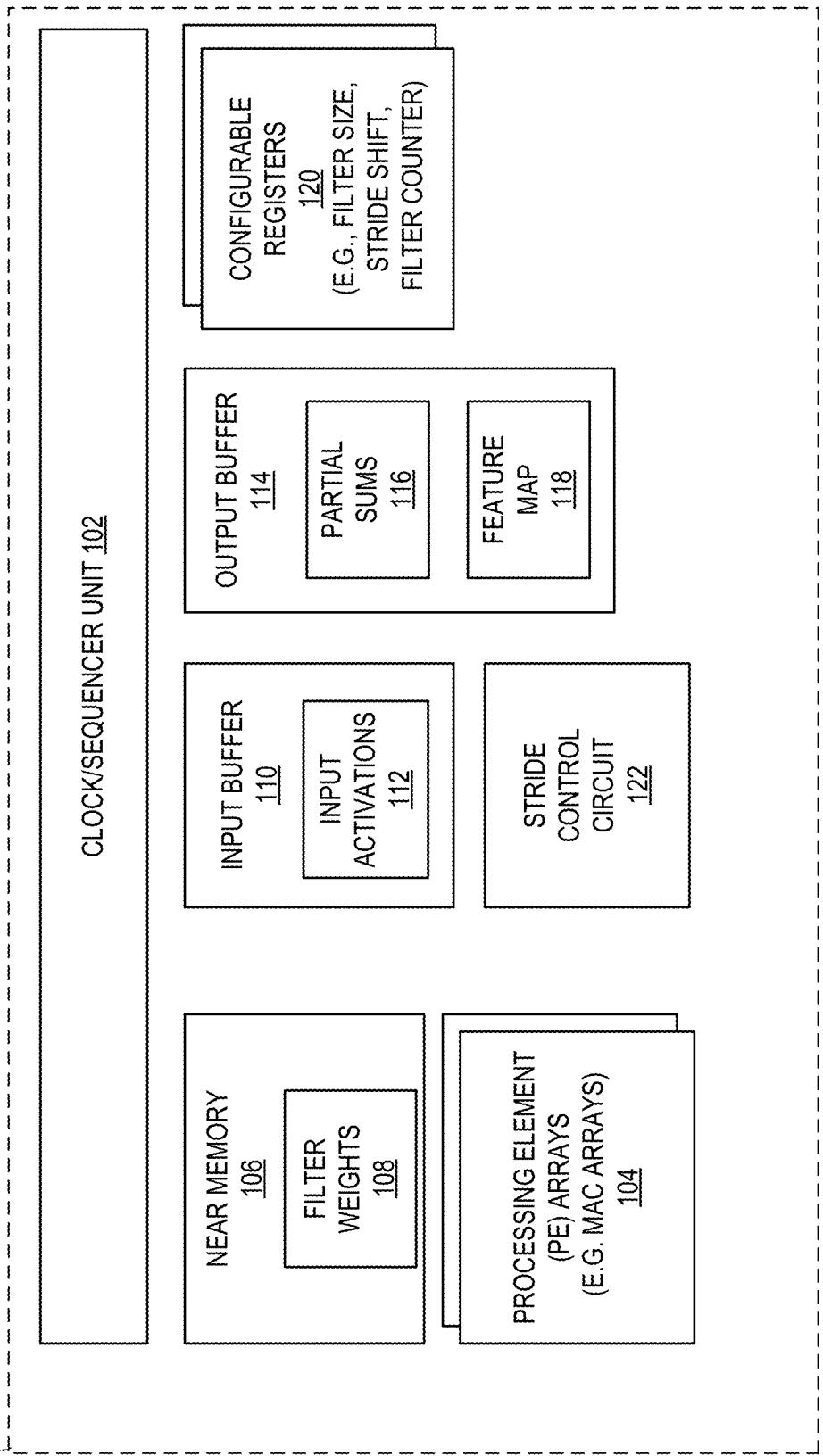
FIG. 1 is a schematic block diagram of an integrated circuitry that includes near memory and a processing element array configured as a compute near memory (CNM) convolution accelerator in accordance with various examples described herein.

Other features of the described embodiments will be apparent from the accompanying drawings and from the detailed description that follows.

DETAILED DESCRIPTION

Existing approaches to improve the efficiency of convolution operations in CNNs include performing the convolutions in-place. In-place convolution refers to re-using the weights by striding them over stationary input activations one or more positions at a time and performing the convolution at each stride.

Some inference accelerators for CNNs use dedicated acceleration to perform in-place convolution operations with application-specific integrated circuits (ASICs). To re-use weights in a CNN requires substantial data traffic in between compute units of an ASIC. For this reason, in-place convolution performed using dedicated acceleration can result in many bits travelling over distances which, in turn, creates energy and performance challenges.

Another approach to improve the efficiency of convolution in CNNs includes transforming the convolution layers into a large matrix (referred to as lowering, or im2col operation) and accelerating the entire operation on a general purpose processor. For example, some general purpose processors accelerate convolution operations by mapping the lowered convolution layers to a well-known generalized matrix-matrix multiplication operation (or GEMM). While the lowering operation maps the convolution and striding operations to hardware-friendly GEMM operations to complete processing a convolution layer, the additional lowering/im2col operation requires redundantly copying many values of the input activations into a scratch-pad type of memory multiple times to capture the effects of striding in order to form the matrix operands. The redundant data replication increases both memory space requirements and energy consumption from memory accesses, thereby limiting the efficiencies gained from any type of hardware acceleration of GEMM operations.

To address the foregoing challenges, a compute near memory (CNM) convolution accelerator configured in accordance with various examples as herein described enables a CNN to use dedicated acceleration to achieve efficient in-place convolution operations with less impact on memory and energy consumption.

In one embodiment, the CNM convolution accelerator includes circuitry to accelerate in-place convolution operations for deep-learning CNNs in an energy-efficient way. For example, instead of lowering the convolution and striding operation into a large matrix, as in the GEMM approach described above, a two-dimensional (2D) convolution operation is reformulated as one-dimensional (1D) row-wise convolution. The 1D row-wise convolution enables the CNM convolution accelerator to process input activations in 1D, row-by-row, while using the weights in 1D, one-by-one. In one embodiment, the CNM convolution accelerator "unrolls" the for-loop of the striding operation by processing, one-by-one, each weight in a row of weights against all input activations in a row of input activations. Rather than shifting the position of a weight, the CNM convolution accelerator shifts access to the positions of the input activations in the input activation row to accomplish the striding operation in-place.

For example, in one embodiment, the rows of a filter are distributed to near-memories, and the input activation rows are streamed row-by-row to an input buffer. Both the near-memory and input buffers are accessed by one or more arrays of parallel multiply-accumulate (MAC) units. As the for-loop of striding is unrolled, convolution is performed by multiplying a single weight (of a filter row) with each of the input activations in an input activation row. Based on the position of the next single weight within the filter row, access to the input activation row is shifted by one position in preparation for multiplying the next single weight in the filter row with the shifted input activations, and the for-loop of striding is repeated until all of the weights in the filter row have been processed. The convolution is repeated until all channels of input activation rows have been convolved with the corresponding channels of filter rows in channel-wise order. The results of the convolutions are accumulated into a partial sum. In this manner, embodiments of the CNM convolution accelerator enable the full utilization of array(s) of parallel MACs at every clock cycle.

In one embodiment, the CNM convolution accelerator is configured with modular CNM circuit blocks of near memory and MAC array(s). In one embodiment, the filter rows are distributed to and stored in the near memories of each CNM circuit block in row-wise order such that the first rows of the filter for all of the channels are distributed to a first CNM circuit block, the second rows of the filter for all of the channels are distributed to a second CNM circuit block, and so forth. The distribution of the filter rows to separate CNM circuit blocks enables the input activation rows to be reused at each consecutive core and to be convolved in parallel fashion with the weights in each filter row.

Near-memory compute operation described herein refers to enhancing memory sub-arrays with compute capability (such as MAC operation). In conventional computing paradigm, memory and compute (or processor, or processing elements) are physically and logically split, which creates the well-known global memory-bottleneck. In contrast to conventional computing, enhancing memory sub-arrays with localized compute mitigates the memory-bottleneck challenges by reducing energy and latency associated with bits traveling over long distances, and by further increasing the available local memory bandwidth to each compute unit. Therefore, compute-near-memory may refer to physically placing compute in the memory sub-array abstraction (such as compute-in-memory), or physically placing compute right next to the memory sub-arrays (such as compute-near-memory), for minimizing the energy and latency spent on data traveling. In this way, the memory is partitioned into multiple sub-arrays, each tightly coupled with a small number of compute units, which distributes memory and compute in a fine-grained manner.

In one embodiment, each CNM circuit block is arrayed in 1D systolic fashion to assemble the accumulated partial sums into an output feature map that can be used for inference tasks in a machine learning application.

A CNM convolution accelerator as described herein has the potential to deliver excellent energy-efficiency and area-efficiency targets in terms of tera operations per second (TOPs) per watt (W) and TOPs/mm2 for dedicated CNN accelerators. For example, performing 1D row-wise convolution allows for fully utilizing MAC arrays with a lightweight access circuit that enables utilizing peak available TOPs/W and TOPs/mm2 every clock cycle. Lightweight access circuitry described here refers to implementing shifted access capability using a minimal number of small gates such as muxes and AND/OR gates. As a result, the hardware impact in terms of extra area, energy consumption, and latency associated to the access circuitry can be kept at minimum. In addition, lightweight access circuits provide the ability to stream both weights and input rows as vectors to MAC units, which in turn enables mapping [1×1] convolution layers as a matrix-matrix multiplication to the same CNM circuit used to map larger [3×3] convolution layers as an in-place convolution. As a result, a single CNM convolution accelerator as described herein is versatile—capable of implementing convolution for both [1×1] and chosen [n×n] sized filters (e.g., typically n=3) or other [i×j] filters.

In one embodiment, fine-grained distributed near memory provides maximum bandwidth for accessing weights while enabling low memory access energy for weight re-use. Fine-grained memory and compute distribution further provide flexibility and scalability for various use-cases and deep neural network problem sizes.

FIG. 1 is a schematic block diagram of integrated circuitry that includes near memory and processing element array(s) configured as a CNM convolution accelerator 100 in accordance with various examples described herein. In one embodiment, the CNM convolution accelerator 100 includes one or more processing element arrays 104, such as an array of dedicated parallel MAC units, each of which is capable of performing a dot product operation on data transmitted to the MAC units, in this case data representing a weight selected from filter 108 and data representing an input activation from input activations 112.

In one embodiment, during operation, the filter 108 is distributed row-by-row in channel-wise order to near memory 106. A near memory 106 typically comprises a small memory or memories made of volatile memory such as an SRAM (static random access memory) that is coupled near to the one or more processing element arrays 104 to minimize latency when transmitting data between the processing elements and the SRAM. In one embodiment, the near memory 106 comprises a register file (RF) of processor registers in a central processor unit (CPU), where the RF is typically implemented as a fast SRAM with multiple ports for transmitting data to and from near memory and other components of the CNM convolution accelerator 100 with minimized latency.

Once distributed to near memory 106, the weights from each row of filter 108 are transmitted, one-by-one, to the MAC array 104. Input activations are streamed to an input buffer 110, row-by-row, to the MAC array 104 in coordination with the weights. In one embodiment, a stride control circuit 122 enables a striding operation by controlling the MAC array 104 access to the input activations according to their position in the input buffer. The striding operation is repeated as needed for each weight in the row of filter 108 based on the weight's position within the filter row and a stride amount. The stride amount shifts the input activations of an input activation row streamed to the input buffer by the stride amount. The weight's position within the filter row determines which input activations in the input buffer are accessible to the MAC array 104.

In one embodiment, an output buffer 114 is used to accumulate the dot product of a weight and an input activation as generated by the parallel MAC units of the MAC array 104. The dot products accumulated in the output buffer 114 represent partial sums 116 of a convolution operation on the row of filters and the row of input activations. The partial sums 116 are ultimately assembled into the output feature map 118.

In one embodiment, a sequencer unit 102 is programmed in accordance with the contents of one or more configurable registers 120 to coordinate the transmission of the data representing the filter 108 and input activations 112 to the near memory 106, the input buffers 110 and output buffers 114 and to the MAC array 104. The sequencer unit 102 coordinates the transmission of the data to time multiplex the striding and convolution operations for optimal efficiency. In one embodiment, the sequencer unit 102 coordinates the transmission of and access to the data such that weights 108 and input activations 112 are streamed continuously (at every clock cycle) to optimize the efficiency of the striding and convolution operations.

In one embodiment, the configurable registers 120 can include an integer value for a stride shift input (e.g., stride by 1 position) used by the stride control circuit 122 to perform the striding operation, i.e., the operation to shift the MAC array 104 access to the positions of an input buffer containing input activations of the input activation row in preparation for the convolution operation. The configurable registers 120 can also include a filter counter for controlling access, one-by-one, to the next weight in each row of filter 108 accessed by the MAC array 104. In one embodiment, the filter counter is based on a total number of weights contained in all channels of the filter's rows distributed to near memory 106. In one embodiment, the filter counter is reset when all of the weights in the channels of filter rows have been processed and/or a new batch of input activation rows 112 is transmitted to the input buffer 110 of the CNM convolution accelerator 100.

In one embodiment, configurable registers 120 can include the dimensions of the filter 108 and input activations 112 to enable the clock/sequencer unit 102 to configure an appropriate size of the input buffer(s) 110 and output buffer(s) 114 and near memory 106, as well the type and number of MAC units 104 to program in the CNM convolution accelerator 100. In this manner, resources in a CNM convolution accelerator 100, such as the memory, buffers and processing elements, can be customized to efficiently support different types of filters 108 and input activations 112, the dimensions of which can vary widely depending on the machine learning application.

In one embodiment, when the CNM convolution accelerator 100 is implemented on a field programmable gate array (FPGA), the contents of the configurable register(s) 120 effectively allow runtime configuration of the CNM convolution accelerator 100 for a particular machine learning application.

Figure 2:
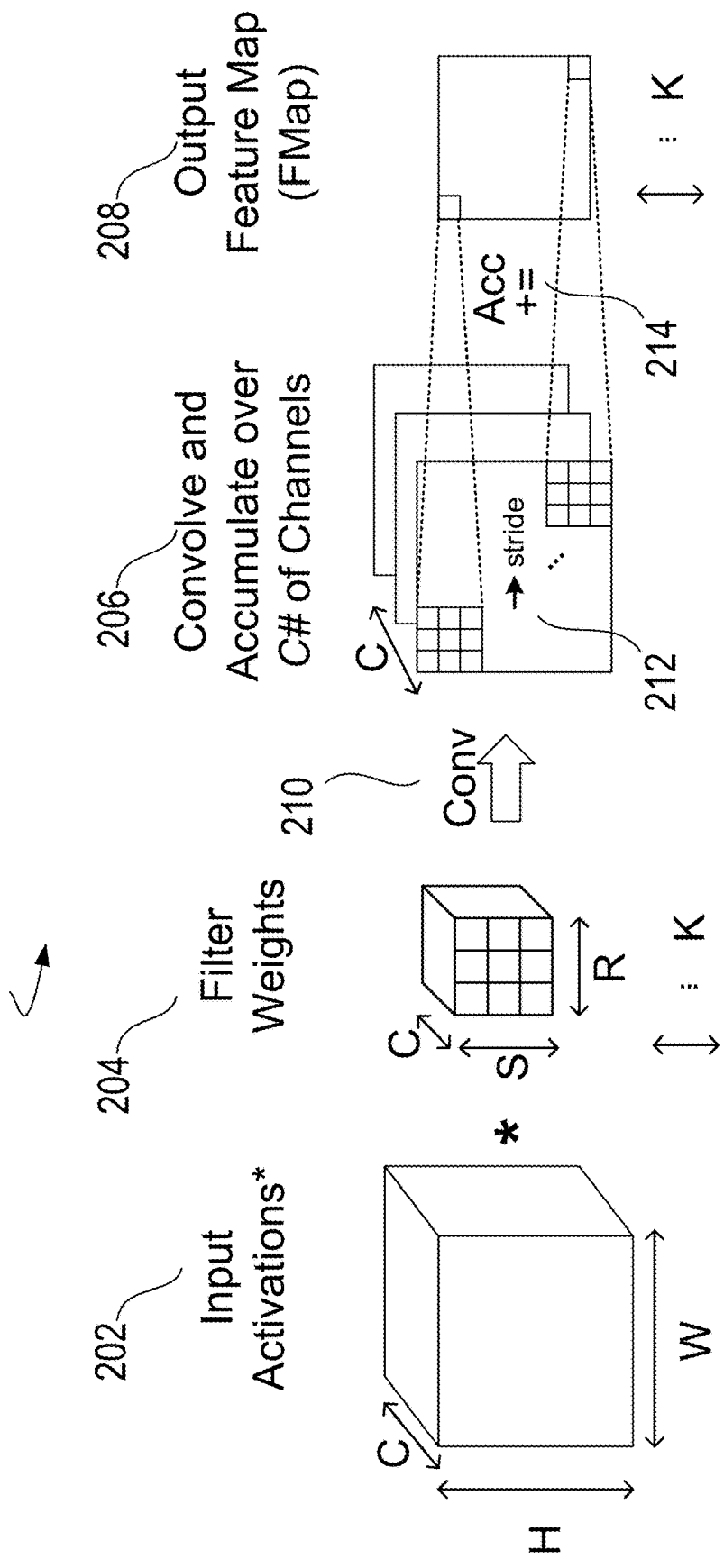
FIG. 2 is a schematic block diagram of an example in-place convolution operation that can be implemented in the CNM convolution accelerator of FIG. 1 in accordance with various examples described herein.

FIG. 2 is a schematic block diagram of an example in-place convolution operation that can be implemented in the CNM convolution accelerator 100 described in FIG. 1 in accordance with various examples described herein. As shown, an in-place convolution operation is mathematically represented as a three-dimensional (3D) matrix operation. In the illustrated example, H represents the input activation height of 3D input activation matrix 202, W represents the input activation width, and C represents the input activation channels. Each channel represents a particular characteristic of the input activations. For example, the channels could represent the colors of pixels in an image—one channel for red, one channel for green, another channel for blue.

For the 3D filter matrix 204, S represents the filter height, R represents the filter width and C represents the filter channels corresponding to the input activation channels. The entire set of filters for all channels [C×S×R] is referred to as a kernel K. A convolution operation can have more than one kernel K, each one resulting in a separate output feature map (FMap) 208, which dictates the number of output channels.

Multiple 3D input activation matrices can be organized into batches, where N represents a batch number of the 3D input activation matrix 202. The 3D in-place convolution operation 210 can be repeated over N batches to yield the Fmap 208.

To carry out the convolution operation 210, each 2D filter matrix 204 associated with a channel is strided over and convolved with 206 the corresponding channel's 2D input activation matrix 202. The striding and convolution are repeated for all channels C and the results accumulated and assembled 214 into the rows of the output Fmap 208 to complete a 3D in-place convolution 210.

In the illustrated example of FIG. 2, to convolve and accumulate 206 includes using a stride operation (e.g., stride by 1) 212 to stride the 2D filter matrix 204 (shown here with dimension [3×3]) over the 2D input activation matrix 202 to generate dot products accumulated 214 into a result for a single output channel. The same stride operation and 2D convolution operation 206 are repeated for all input channels C of the input activations 202. The results form the rows of the FMap 208. The same stride operation and convolution operation 206 is repeated again for all kernels K and input batches N to process a convolution layer.

FIGS. 3A-3B are schematic block diagrams and mathematical expressions illustrating row-wise convolution operations in accordance with various examples described herein. Mathematically, using the example illustrated in FIG. 2, the 2D convolution operation 206 for a single channel can be performed row-by-row in a 1D fashion to obtain the partial results, referred to as partial sums (PSums), which are then used to form the rows of the FMap 208.

For example, with reference to FIGS. 2 and 3A, the 2D filter matrix 204 for one channel C can instead be separated into three 1D filter rows of size [1×3] 304-1, for an example filter size [S×R] or [3×3]. The [1×3] filter rows can then be strided over a single row of input activation matrix 202. At each stride, 1D convolution is performed to compute a partially constructed output row, referred to as a partial sum (PSum) 306. In this manner, three [1×3] filter rows 304-1 can be convolved over an entire input activation row 302 to compute a partially constructed output row, the Psum 306. Because the three [1×3] filter rows 304-1 separately convolve the input activation row 302, the results are added element-wise to yield the Psum 306. The same set of operations can be repeated over all input activation rows (e.g., rows 1 through H of input activations 202, FIG. 2), and over all channels C, for the three filter rows 304-1. The resulting PSums 306 form the output FMap 208 (FIG. 2).

In one example, as shown in FIG. 3A, a 1D convolve operation 300-1 includes a stride operation (e.g., stride by 1) to stride all 3 weights in a 1D filter 304-1 having dimension

[1×3] over a single input activation row 302 to obtain Psums 306, y0, y1, y2, y3, y4 and y5 in six cycles 308, Cycle 0 through Cycle 5.

As illustrated in FIG. 3B, an alternative 1D convolve operation 300-2 includes the same stride operation (e.g., stride by 1) to stride a single weight (a, b or c) 304-2 of a 1D filter 304-1 having dimension [1×3] over a single input activation row 302 to obtain the same PSums 306, y0, y1, y2, y3, y4 and y5 in only three cycles 312, half as many cycles as the 1D convolve operation illustrated in FIG. 3A. If the operation in FIG. 3A is considered as a "while loop" or a "for loop", then fewer cycles are possible because the 1D convolve operation in FIG. 3B is the "unrolled loop" version of the same set of operations in FIG. 3A, where a single weight (a, b, or c) is used per cycle to convolve the entire input activation row 302.

Figure 4A:
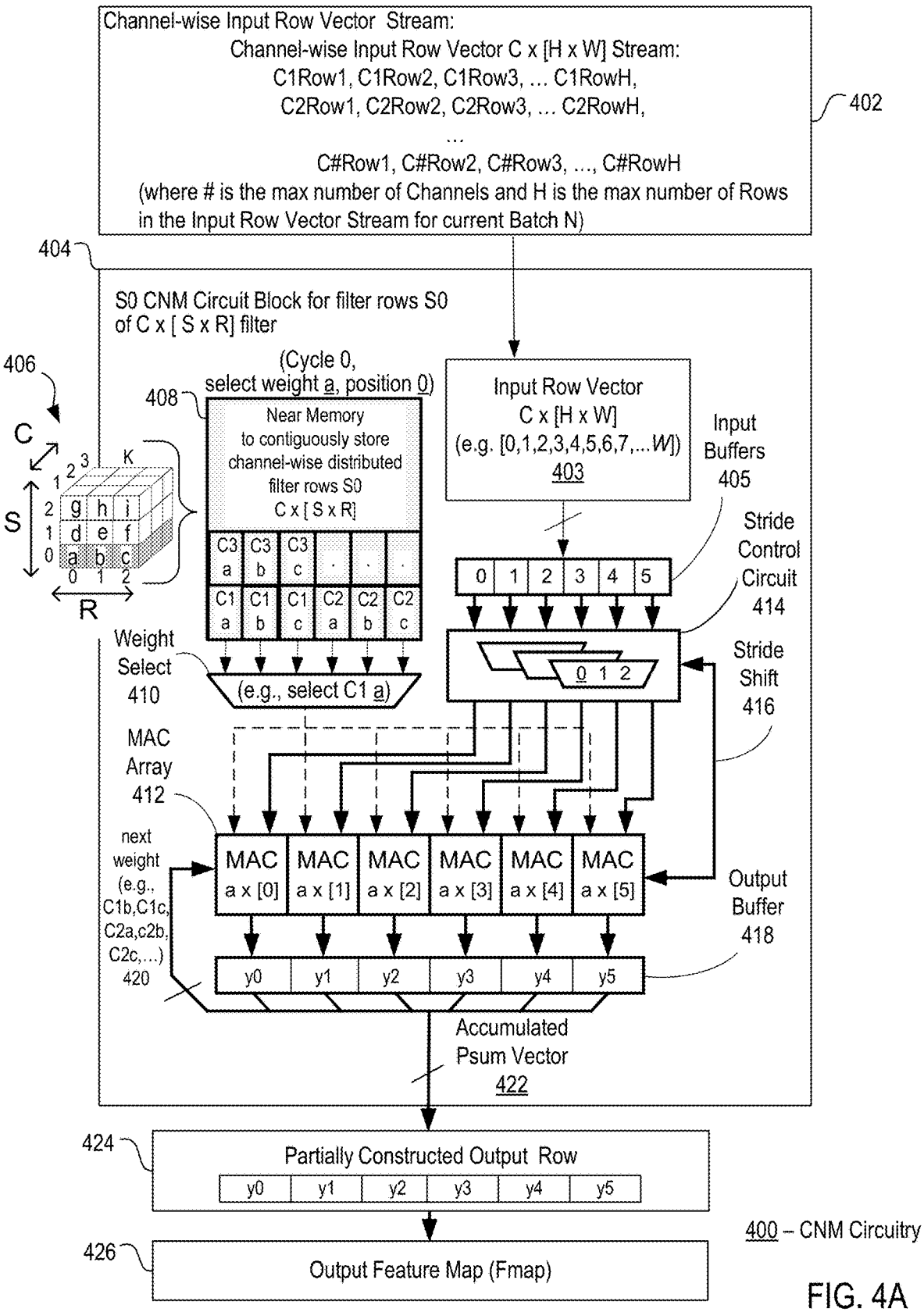
FIGS. 4A-4E are schematic views of a CNM convolution accelerator in accordance with various examples described herein.

FIGS. 4A-4E are schematic views of a CNM convolution accelerator in accordance with various examples described herein. FIG. 4A illustrates one example of CNM circuitry 400 that can be used to implement the CNM convolution accelerator 100 introduced in FIG. 1. In one embodiment, the CNM circuitry 400 leverages the alternative 1D convolve operation 300-2 described in FIG. 3B, not only to perform in-place convolution operations in fewer cycles, but also to perform in-place convolution operations with less impact on memory and energy consumption than existing dedicated accelerators and general processor in-place convolution approaches.

As illustrated in FIG. 4A, distributed filter rows S of filter 406 are contiguously stored in near-memories channel-wise as a list to maximize spatial data access pattern. During the convolution operation performed in the CNM accelerator circuitry 400, the R weights in each distributed filter row S of filter 406 are accessed with a straightforward counter down the list. For each channel C of R weights in distributed filter rows S of filter 406, the CNM accelerator circuitry 400 selects a single weight R, performs a shift operation on an input row vector (in the corresponding channel C) with respect to the single weight's position within the single filter row S from which it was selected, and then performs the parallel MAC operations. In this manner the CNM accelerator circuitry 400 is capable of performing cycles 0, 1 and 2 (310, FIG. 3B) of the 1D unrolled in-place convolution operation (300-2, FIG. 3B) in an efficient manner.

When advancing to the next channel, the CNM accelerator circuitry 400 receives a new channel of input row vectors 402. The weights R corresponding to the next channel C, e.g. C1, C2, ... ) can again be accessed by continuing down the list of contiguously stored weights in the near-memory, and the shifted parallel MAC operations are repeated for each single weight R in the filter row S from which it was selected. When all of the channels C are exhausted, the CNM accelerator circuitry will have generated a partially constructed y output row 424 which is sent upstream for eventual assembly with other partially constructed y output rows 424 (from other CNM circuit blocks as described in FIGS. 4B-4C) to form output feature map (Fmap) row(s) 426.

In one embodiment, the CNM circuitry 400 includes one or more CNM circuit blocks 404. In one embodiment, a single CNM circuit block 404 is configured to perform a partial convolution on input activations using all channels C of a single filter row Sx having dimension C×[1×R] of filter 406 having dimension C×[S×R] (i.e., the single kernel K), where C=channels and R=filter width. Because a CNM circuit block 404 is configured to perform a partial convolution on input activations with only the single filter row Sx, it is referred to herein as Sx CNM circuit block 404, where x refers to the row index S of the 3D filter 406. In the illustrated example of FIG. 4A, the single filter row is S0, the $0^{th}$ row of a 3D filter matrix such as filter 406 containing weights "a," "b," "c" in respective positions 0, 1 and 2.

In one embodiment, each CNM circuit block 404 for a single filter row (e.g., filter row S0, S1 or S2) of the filter 406 comprises a near memory 408, (typically an SRAM or a RF type memory) to contiguously store all channels C of the distributed single filter weight rows, e.g. all channels C of the distributed single filter weight rows S0. The near memory 408 is coupled to a weight selector 410, such as a multiplex selector circuit, to select a single weight from a single filter row in the channel-wise order in which the rows are contiguously stored. The weight selector 410 is coupled to a MAC array 412 to carry out the multiply and accumulate functions of the partial convolution. Each CNM circuit block 404 further comprises input buffer(s) 405 from which to stream input row vectors 402 that represent the rows of input activations 202 (FIG. 2)/302 (FIGS. 3A-3B) and an output buffer(s) 418 in which to accumulate the PSums 422.

In one embodiment, input activations from an input row vector 403 are held in the input buffer 405. In one embodiment, for small-sized input row vector stream 402, input activations from two batches N of input row vectors could be streamed to input row vector 403 and held in the input buffer 405, side by side, and processed in a single cycle. A stride control circuit 414 is coupled to the input buffer 405 to perform a striding operation that provides the MAC units of the MAC array 412 access to the input activations held in the input buffer in accordance with 1) a current position of the single weight R selected by weight selector 410 and 2) a stride shift value 416.

In the illustrated example in FIG. 4A, the current position of the weight R selected by weight selector 410 is the 0 position selected from positions 0, 1 or 2. The 0, 1 or 2 are the respective positions of the example weights "a," "b" and "c" within the single filter row S0 from which they are selected. In one embodiment, the stride shift value 416 is predetermined or configured at run-time, typically an integer value that corresponds to how much access to the input buffer is shifted during the striding operation in preparation for performing the convolution, e.g., stride by 1, stride by 2, and so forth.

In one embodiment, during each cycle of the operation of a CNM circuit block 404, the input buffer 405 holds all or a portion of the input activations of an input row vector 403. For example, in one embodiment the input buffer 405 holds tiles of an input row vector 403 if the row of input activations is larger than the input buffer. The weight selector 410 and stride control circuit 414 operate as lightweight access control circuits to control the MAC array's 412 access to the input activations held in input buffer 405.

In one embodiment, to perform 1D row-wise convolution with an unrolled for-loop method, the weight selector 410 comprises a multiplexer (mux) connected to an output read port of near memory 408 to select a single weight from the current channel's [1×R] filter row (e.g., Channel 1, filter row S0, Channel 2, filter row S0, and so forth) to start each cycle of operation. In the illustrated example, denoted in FIG. 4A as Cycle 0, the weight selector 410 selects weight "a" in position [0] of Channel 1, filter row S0. To apply shift on the input row vector 403 with respect to the stride shift 416, the stride control circuit 414 comprises a multiplexer array (mux-array) to control the input data provided to the MAC array 412, specifically which input activations stored in input buffer 405 the MAC array can access. In one embodiment, the output buffer 418 holds the PSum vector values 422 resulting from the multiply and accumulation performed by the MAC array 412 on the selected weight "a" and accessed input activations in positions [0]-[5] of input buffer 405.

In one embodiment, each CNM circuit block 404 for a filter row is coupled to an output buffer 418 to contain accumulated PSum vector values 422. The PSum vector values 422 form the partially constructed output rows 424. The partially constructed output rows 424 are assembled and accumulated where appropriate to form an output feature map FMap 426 that represents the result of a convolution of all of the weights with all of the input activations.

Figure 4B:
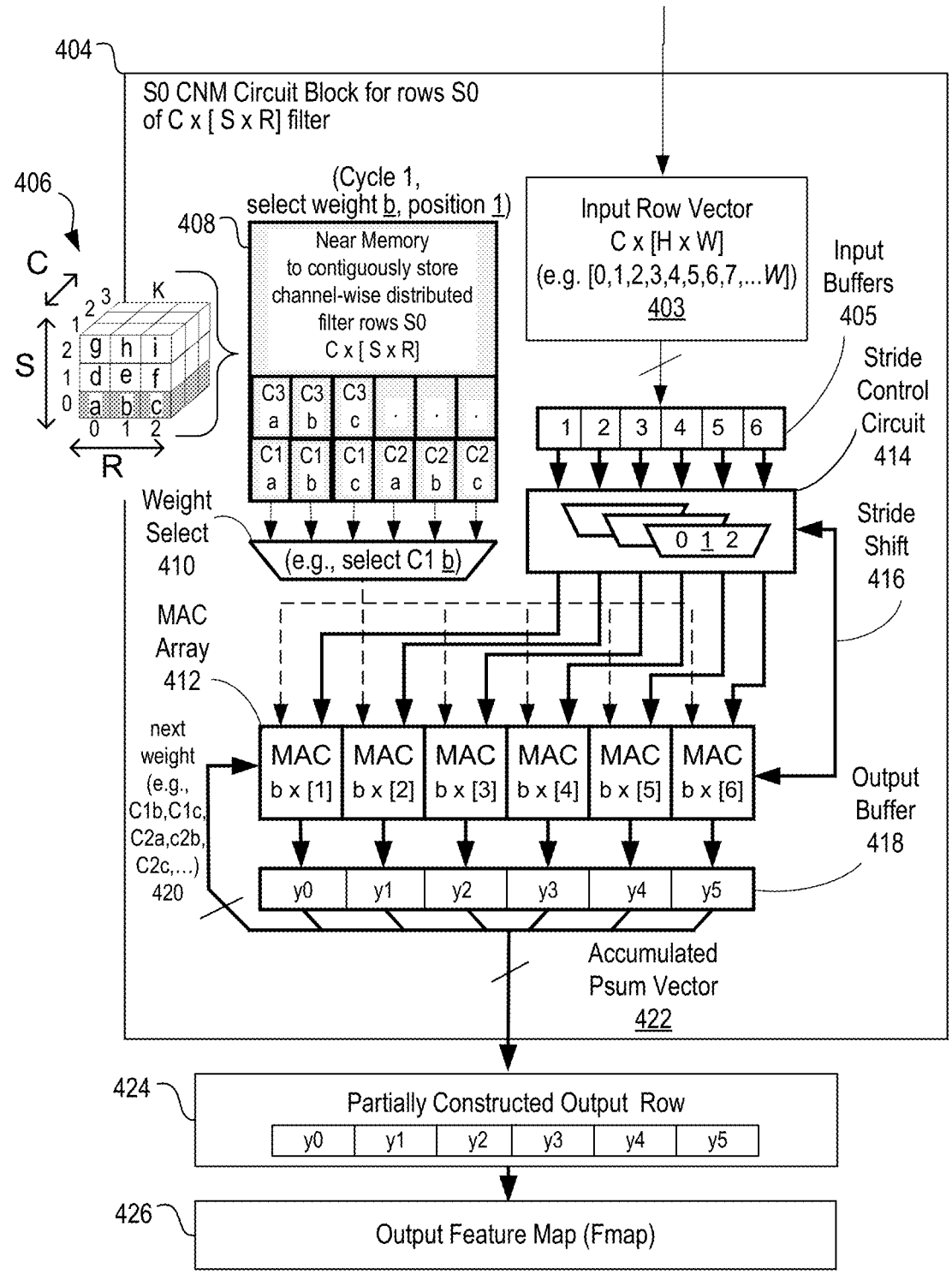
Figure 4C:
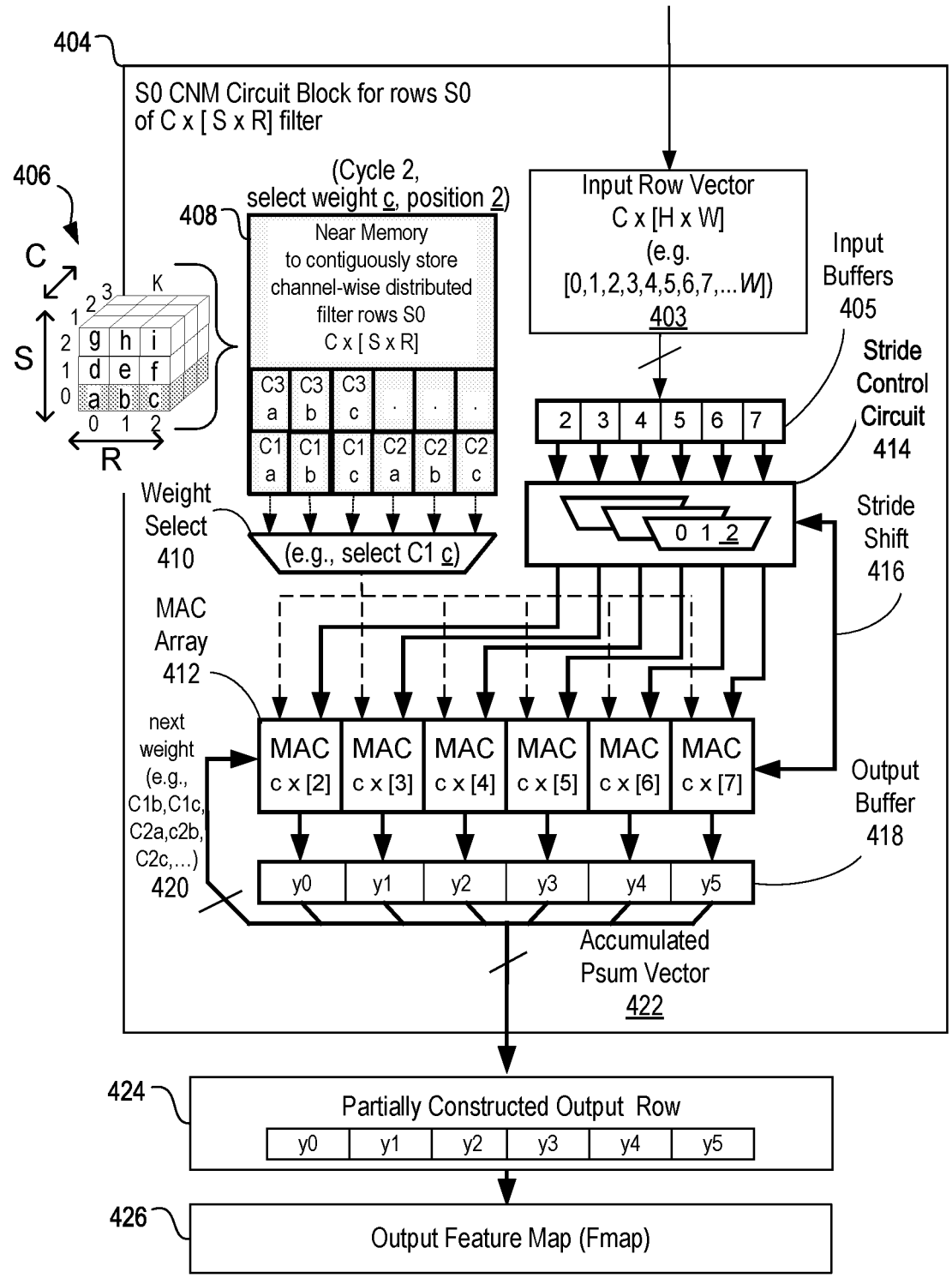

FIGS. 4B-4C illustrate two additional cycles of operation of the CNM circuit block 404 for a filter row in accordance with the various examples described herein. As shown in FIG. 4B, weight "b" in position [1] of the S0 filter row is selected in preparation for a next cycle of operation denoted as Cycle 1. Because the selected weight is in position [1] (as opposed to weight "a" in position [0]), the stride control circuit 414 applies a different shift than was applied in Cycle 0. As a result, the MAC array 412 is provided access to a different set of input activations from input buffer 405 than was provided during the first cycle of operation, Cycle 0. In this example, the set of input activations accessible to the MAC array 412 is shifted by one position for a stride shift 416 of integer 1, so that the convolution is performed on selected weight "b" and positions [1]-[6] of the input buffer 405 (as compared to positions [0]-[5] in Cycle 0 as described in FIG. 4A).

Figure 4D:
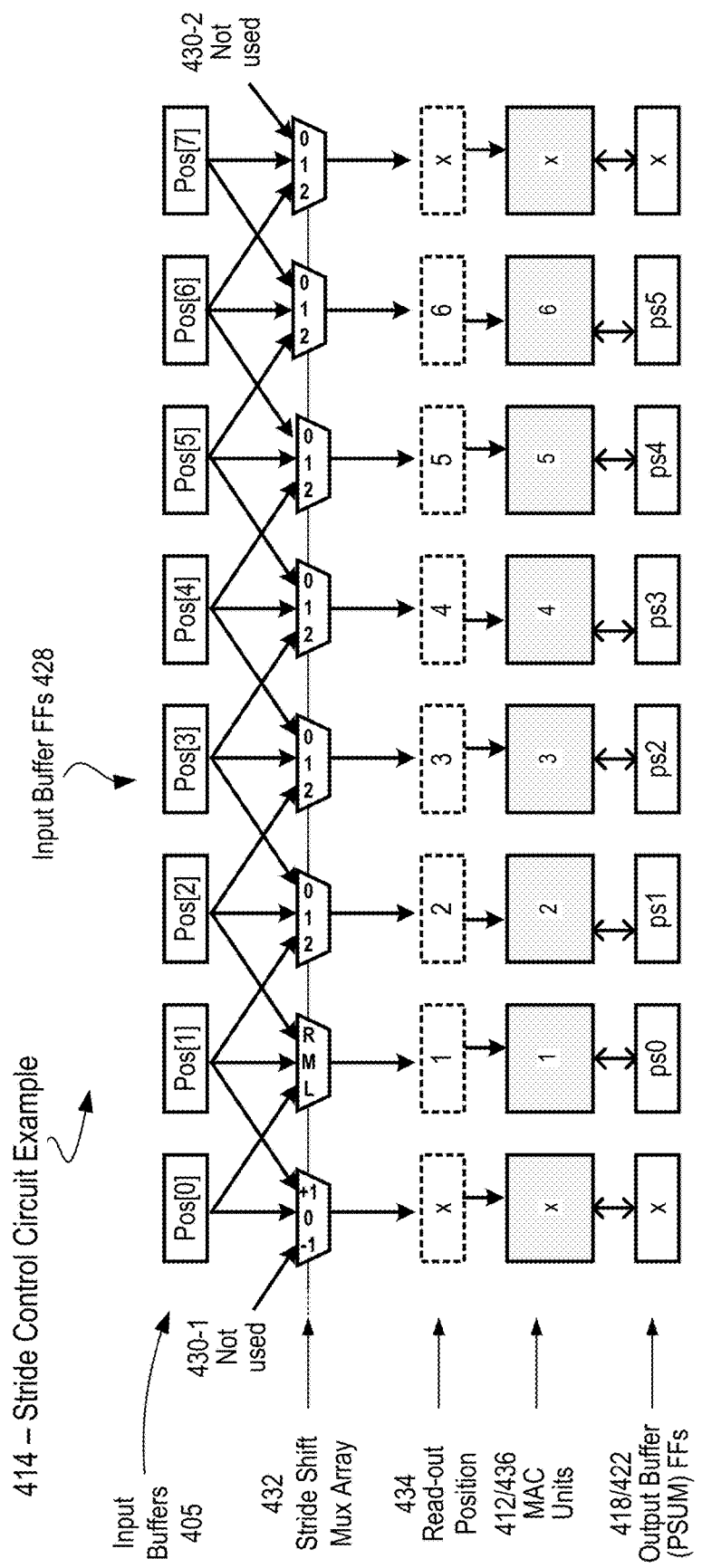

In FIG. 4C, similar to Cycle 2, the set of input activations accessed by the MAC array 412 are shifted by one position for a stride shift 416 of integer 1. This results in an additional shift so that the convolution is performed on selected weight "c" and positions [2]-[7] of the input buffer 405 (as compared to positions [1]-[6] in Cycle 1 as described in FIG. 4B). FIG. 4D illustrates one example of stride control circuitry 414 that can be implemented in the CNM circuitry 400 introduced in FIG. 4A. Circuit details of the stride control circuitry 414 illustrates the operation of the circuitry using an example filter row size of [1×3] and stride shift 416 of integer 1. As shown, the input buffers 405 comprise input buffer flip flops (FF) 428 in positions [0] through [7] for an input buffer 405 of width 8 positions. In this example, the first position 430-1 and the last position 430-2 are typically not used to allow for 0-padding that can be applied to the input row vectors prior to convolution to obtain the desired output width (such as a PSum that is wider, e.g., 8 elements).

In one embodiment, the circuitry 414 has the effect of "shifting" the input row vector by controlling access to the positions of the input buffer 405 containing the input activations that comprise the input row vector. In one embodiment, the "shifted" positions are accomplished through the use of a stride shift mux array 432. For example, as illustrated the input row vector can be "shifted" by {−1, 0, +1} positions when the stride shift 416 integer value is 1 for a weight position of [0], [1] or [2], where 0 shifts the vector to the right (mux R), and 2 shifts the vector to the left (mux L) and 1 maintains the vector position middle (mux M). Different values and different sizes for the stride shift mux array 432 can be used depending on the range of weight positions as determined by the width R of the filter 406, and on the stride shift 416 integer value, e.g., stride by 1, stride by 2, and so forth. The direction of shifting can vary as well to suit the needs of the CNM circuitry 400 to accommodate the size of the input row vectors and filters that comprise the convolution layer. For example, the "shifting" may be performed in reverse left/right order (e.g., mux R M L instead of mux L M R) or top/bottom order as needed.

In one embodiment, during operation a read out position 434 of the stride shift mux array 432 provides the MAC units 436/412 with access to the "shifted" positions of the input row vector stored in input buffer 405. Each MAC unit 436 of the MAC array 412 is coupled to a corresponding output buffer flip flop (FF) 418/422 in which the PSums are stored, e.g., ps 0, ps 1, ps 2, ps 3, ps 4, and ps 5. The PSum FFs 418/422 correspond to the y0, y1, y2, y3, y4 and y5 PSum vectors 422 accumulated in output buffer 418 described in FIG. 4A.

During shifting operations of stride control circuit 414, input buffer FFs 405 keep holding the input activations comprising the input row vector until a new input row vector channel is received. Therefore, the shifting operation is performed by accessing the input buffer FFs 405 in a shifted manner rather than shifting the values in FFs (i.e., the contents of the FFs) to save energy.

Figure 4E:
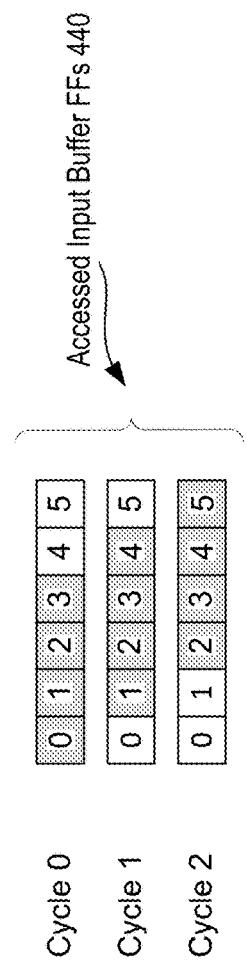

FIG. 4E illustrates example cycle results of a stride control circuit 414 configured for a stride shift 416 integer 1 and a filter row of dimensions [1×3] as described in FIG. 4D. During Cycle 0, for a weight in first position [0] of the [1×3] filter row the stride control circuitry 414 provides access 440 to positions [0], [1], [2] and [3] of the input row vector 403 stored in the input buffer FFs 405. During Cycle 1, for a weight in middle position [1] of the [1×3] filter row the stride control circuitry 414 provides access 440 to positions [1], [2], [3] and [4] of the input row vector 403 stored in the input buffer 405. Finally, during Cycle 3, for a weight in last position [2] of the [1×3] filter row the stride control circuitry 414 provides access 440 to positions [2], [3], [4] and [5] of the input row vector 403 stored in the input buffer 405. Other values for the stride by amount in stride shift 416 and dimensions of the filter rows contiguously stored in near memory 408 of a CNM circuit block 404 of the CNM circuitry 400 can yield different results for each cycle of operation of the stride control circuitry 414 and CNM circuit block 404

Figure 5:
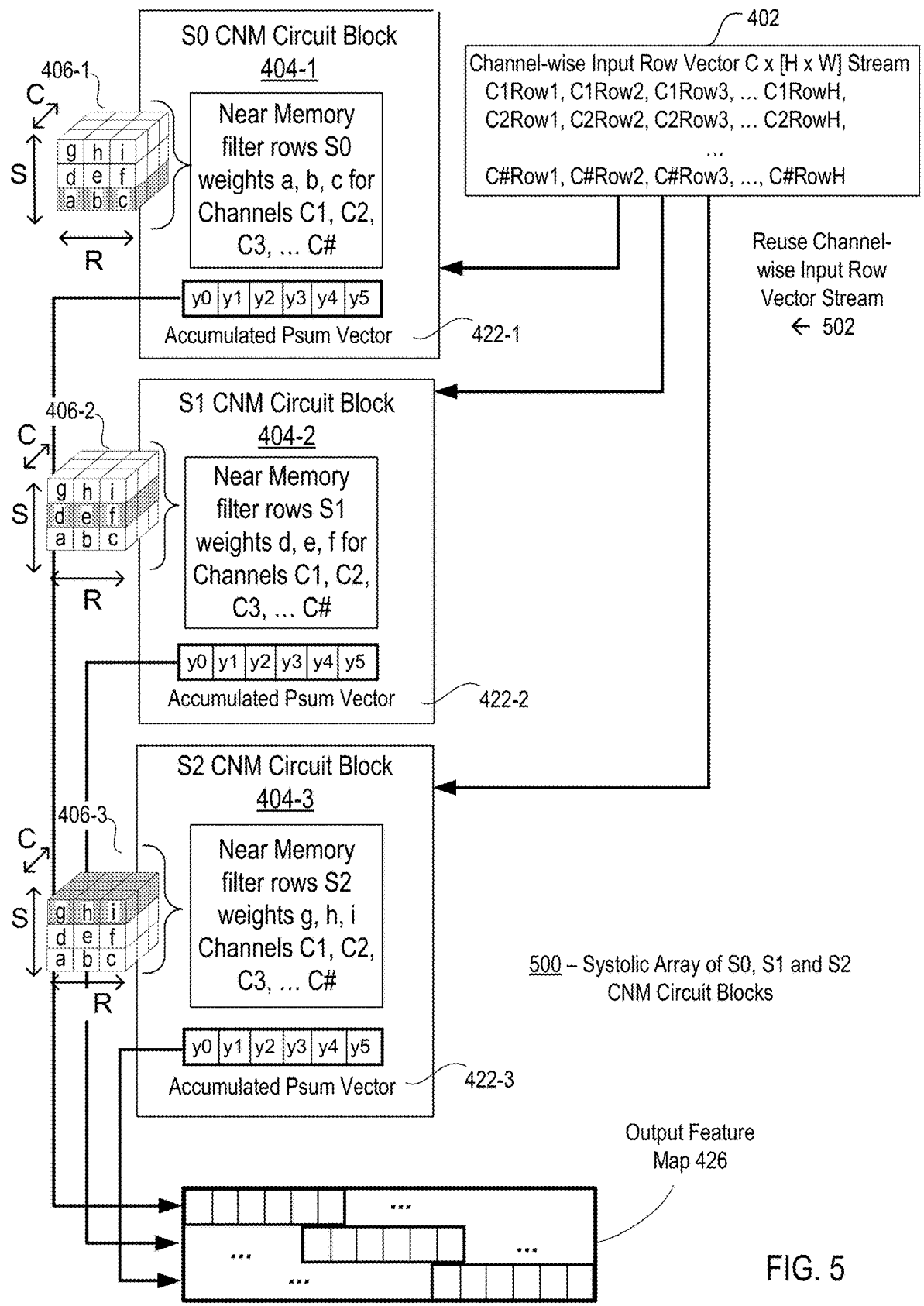
FIG. 5 is a schematic view of an array of circuit blocks for a CNM convolution accelerator in accordance with various examples described herein.

FIG. 5 illustrates an example of a systolic array 500 of CNM circuit blocks 404 introduced in FIGS. 4A-4E. As shown, multiple CNM circuit blocks 404 can be arrayed in 1D systolic-array fashion to implement CNN acceleration. For example, the S0 CNM circuit block 404-1 to which the channels C of S0 filter rows 406-1 have been distributed is arranged along with counterpart S1 CNM circuit block 404-2, to which the channels C of S1 filter rows 406-2 have been distributed, and counterpart S2 CNM circuit block 404-3, to which the channels C of S3 filter rows 406-3 have been distributed.

In one embodiment, during operation, the input row vectors 402 are streamed-in channel-wise and down-stream, for high data reuse 502, to each of the CNM Circuit blocks 404-1, 404-2, 404-3 comprising the array 500. The convolution results contained in the accumulated PSum Vectors 422-1, 422-1 and 422-3 are passed from CNM circuit block to CNM circuit block and eventually assembled into the output feature map Fmap 426.

Figure 6:
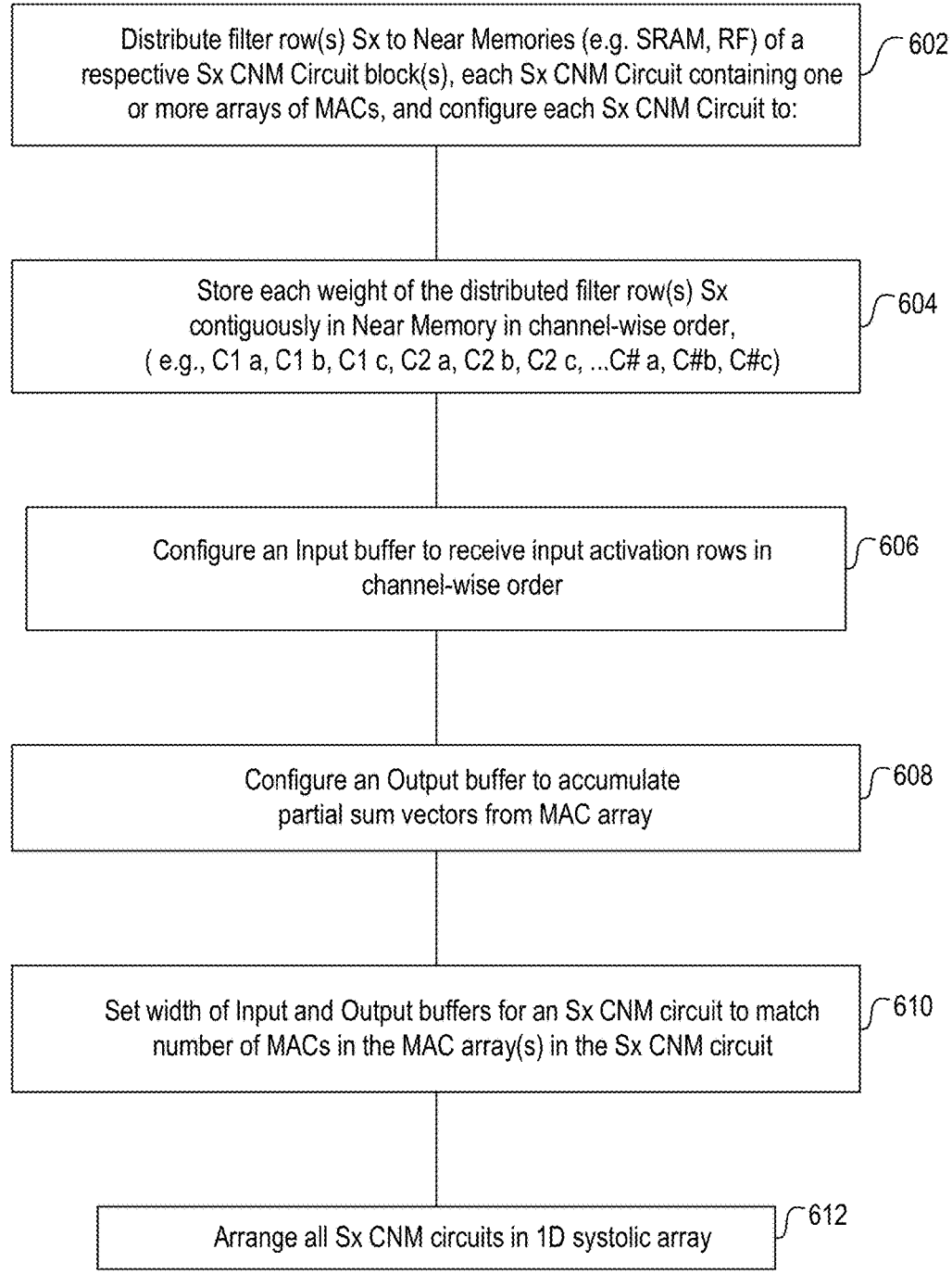
FIGS. 6 and 7 are flow diagrams of a processes for a CNM convolution accelerator in accordance with various examples described herein.
Figure 7:
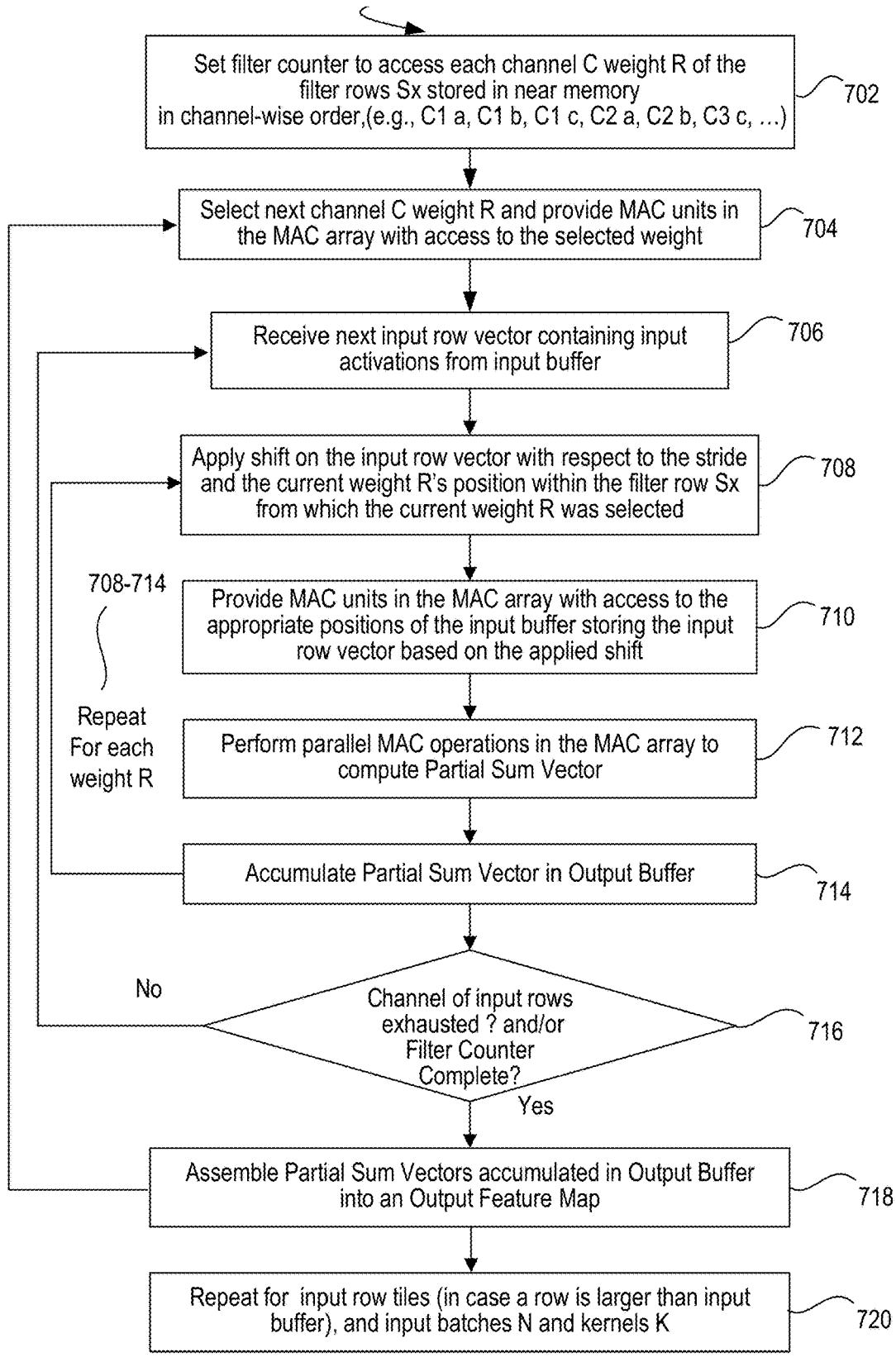

FIGS. 6 and 7 are flow diagrams of various processes for a CNM convolution accelerator in accordance with various examples described herein. Specifically, FIG. 6 illustrates a process flow for preparing a CNM circuit block for accelerating convolution operations.

At process 602, a CNM convolution accelerator distributes filter row(s) Sx to near memories (e.g. SRAM, RF) of respective Sx CNM circuit blocks, each block containing one or more arrays of MAC units. Each Sx CNM circuit block is configured in accordance with the size of the filter, the stride by amount and the size of the input activation vector rows being processed.

For example, at process 604, each weight in the distributed filter rows Sx are stored contiguously in near memory in channel-wise order, e.g. (e.g., C1 a, C1 b, C1 c, C2 a, C2 b, C2 c, . . . C# a, C#b, C#c) to enable them to be selected and streamed to the MAC array, one-by-one, in channel-wise order. At process 606, the input buffer of the CNM circuit block is configured to receive the input activation vector rows in channel-wise order as well to enable coordinated convolution operations of the weights with the input activations for each channel In one embodiment, at process 608, the output buffer of the CNM circuit block is configured to accumulate the partial sum vectors generated by the MAC array. In one embodiment, at process 610, the width of the output buffer and MAC units of the MAC array are matched to or otherwise coordinated with the width of the input buffer to maximize efficiency and minimize memory and storage. Lastly, at process 612, the configured CNM circuits are arranged to form a 1D systolic array to facilitate data reuse of the input activation row vectors to maximize efficiency and minimize memory and storage.

FIG. 7 illustrates a process flow for the Sx CNM circuit block operations for accelerating convolution operations. To begin, at process 702, a filter counter is set to access, in channel-wise order, each weight R of the filter row Sx stored in near memory. In one embodiment, the filter row Sx belongs to a 3D filter having multiple channels of filters C×[S×R] that comprise a convolution kernel K. At process 704, a next channel C single weight R from filter row Sx is selected and made accessible to each MAC unit in the MAC array. At process 706, a next input row vector containing input activations is received into the input buffer. At process 708, the stride control circuit applies a shift to the input row vector stored in the input buffer with respect to the current stride by value (a dynamically configured or predetermined value) and the current single weight's position within the filter row Sx from which the current single weight R was selected. At process 710, the MAC operations begin by providing the MAC units in the MAC array with access to the appropriate "shifted" positions of the input buffer storing the input row vector based on the applied shift performed at 708.

The MAC operations continue at process 712 in parallel on the input activations in the input row vectors streamed to the input buffer to compute partial sum vectors. At process 714, each partial sum vector from process 712 is accumulated in an output buffer until the input activation row has been convolved with the selected weight R. Processes 708 through 714 are repeated for each single weight R selected from filter row Sx for the current channel C (as described, for example, in FIGS. 4A-4C as Cycle 0, Cycle 1 and Cycle 2 for weight "a" in position [0], weight "b" in position [1] and weight "c" in position [2]).

Processing continues at decision block 716 to determine whether the channels of input activations have been exhausted and/or the next weight for the next channel should be selected. If not, then the processing of the input activations continues beginning again at process 706 to receive the next input row vector containing input activations from the input buffer. However, if the channels of input activations have been exhausted, then at process 718 the computed partial sum vectors accumulated in the output buffer (at 714) are assembled into a single output feature map (FMap).

In one embodiment, for convolutions of multiple batches N of input activations, the processes in FIG. 7 can be repeated for each batch. In one embodiment, the processes may be repeated with different filters contained in additional kernel(s) K to generate corresponding additional output feature maps. For example, at process 720, the same process flow 700 is repeated for each input row (or, similarly, tiles of input rows if the row of input activations is larger than the input buffer), for input batches N and kernels K to finish processing the all input activations row-by-row.

In one embodiment, any of the CNM circuit blocks described in FIGS. 4A-4E and 5, and accompanying processes described in FIGS. 6 and 7, can be pipelined into to 2 pipe-stages, where input buffer 405 and near memory 408 implement the first pipeline stage, and the output buffer 418 implements the second pipeline stage. Using the dual pipelines, as long as input row vectors 402 are streamed-in every R clock cycles, where R is the width of the single filter row S distributed to the CNM circuit blocks, i.e., where R is the number of weights in a single filter row, the entire pipeline remains full and compute efficiency is maximized.

In one embodiment, MAC arrays 412 can be implemented with combinatorial circuits only, while in other embodiments, MAC arrays 412 can be built with pipeline stages of their own without impacting the overall working mechanism of the CNM circuit blocks 404. In one embodiment, the input 405 and output 418 buffer widths and MAC array 412 unit count are matched to maximize MAC utilization at every clock cycle. In addition, in one embodiment, bit-precision of network parameters and the MAC unit/MAC array 412 arithmetic can be implemented to match any hardware requirements (e.g. integer, floating point, mixed precision, etc.).

It should be noted that the above-described operation of the CNM accelerator circuitry 400 is versatile in that it can accommodate filters of various dimensions, not just the [3×3] filter and [1×3] filter rows described in the examples. For example, in one embodiment, to implement a [1×1] convolution operation with a single weight filter, the weight selector 410 and stride control circuit 414 can be bypassed to access both weights and inputs as vectors to perform dot-product based MAC operations to emulate conventional matrix-matrix multiplication (similar to existing GEMM accelerators).

In addition, the above-described operation of the CNM accelerator circuitry 400 is versatile in that it can accommodate convolution layers of various dimensions, including those convolution layers that have small input row vector sizes. For example, in a convolution layer with small input row vectors sizes, multiple batches N of the convolution layer can be processed at once by streaming two (or more) batches to the CNM accelerator circuitry 400 simultaneously such that the individual weights of the filter rows can be simultaneously applied to input activations of two separate batches in parallel.

Figure 8:
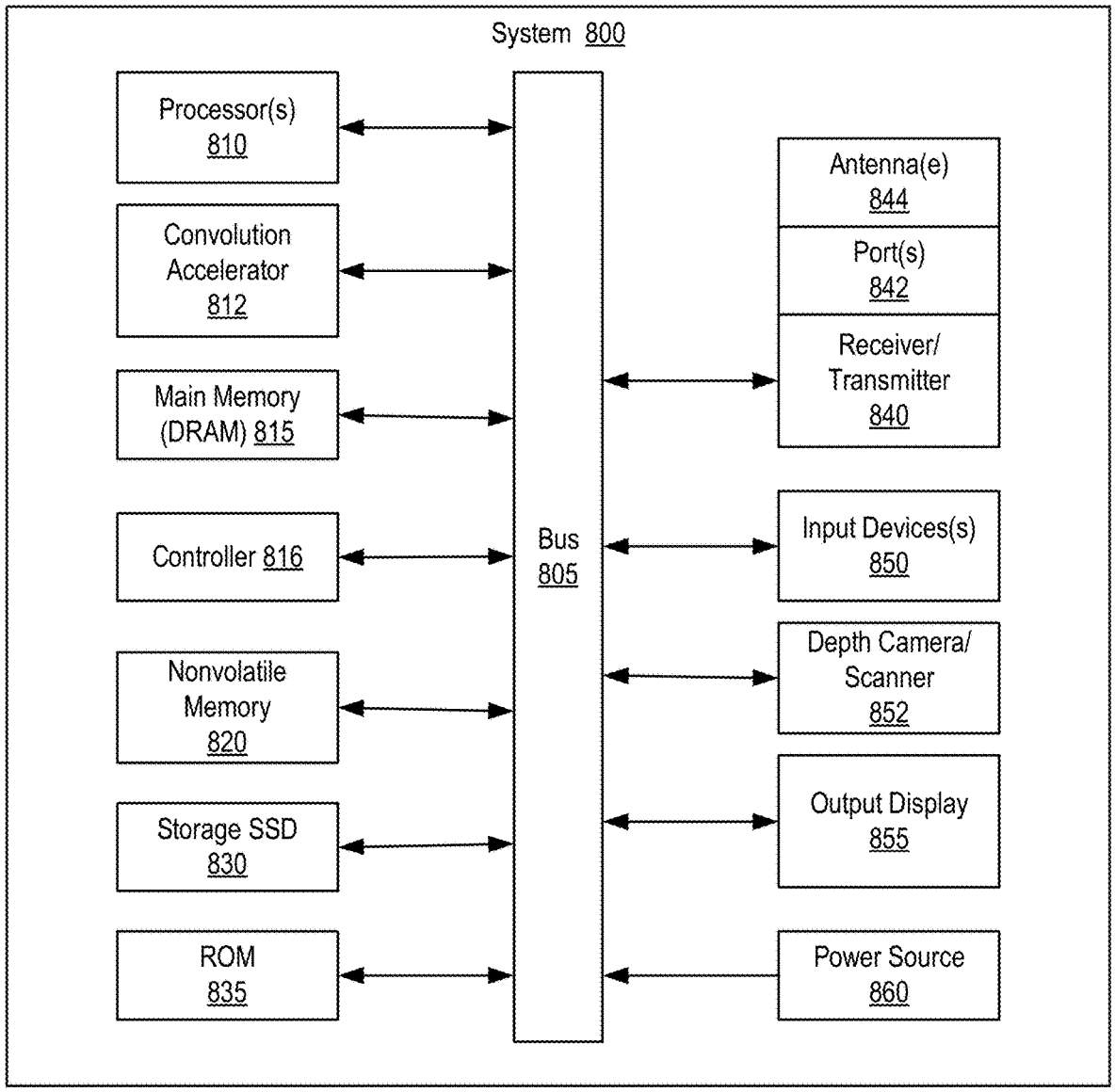
FIG. 8 is a schematic block diagram of a computing system in which a CNM convolution accelerator can be implemented in accordance with various examples described herein.

FIG. 8 is an illustration of a system in which a CNM convolution accelerator can be implemented according to an embodiment. In this illustration, certain standard and well-known components that are not germane to the present description are not shown. Elements shown as separate elements may be combined, including, for example, a SoC (System on Chip) combining multiple elements on a single chip.

In some embodiments, a computing system such as platform 800 may include a processing means such as one or more processors 810 coupled to one or more buses or interconnects, shown in general as bus 805. The processors 810 may comprise one or more physical processors and one or more logical processors. In some embodiments, the processors may include one or more general-purpose processors or special-purpose processors. The platform 800 may include a processing means such as one or more accelerators, such as a convolution accelerator 812 in accordance with the examples described herein.

The bus 805 is a communication means for transmission of data. By way of example only and not limitation, the bus 805 is illustrated as a single bus, but can represent multiple different interconnects or buses and the component connections to such interconnects or buses may vary. The bus 805 shown in FIG. 8 is an abstraction that represents any one or more separate physical buses, point-to-point connections, or both connected by appropriate bridges, adapters, or controllers.

In some embodiments, the computing system 800 further comprises a random access memory (RAM) or other dynamic storage device or element as a main memory 815 and memory controller 816 for storing information and instructions to be executed by the processors 810. Main memory 815 may include, but is not limited to, dynamic random access memory (DRAM).

The computing system 800 also may comprise a non-volatile memory 820; a storage device such as a solid-state drive (SSD) 830; and a read only memory (ROM) 835 or other static storage device for storing static information and instructions for the processors 810.

In some embodiments, the computing system 800 includes one or more transmitters or receivers 840 coupled to the bus 805. In some embodiments, the computing system 800 may include one or more antennae 844, such as dipole or monopole antennae, for the transmission and reception of data via wireless communication using a wireless transmitter, receiver, or both, and one or more ports 842 for the transmission and reception of data via wired communications. Wireless communication includes, but is not limited to, Wi-Fi, Bluetooth™, near field communication, and other wireless communication standards.

In some embodiments, computing system 800 includes one or more input devices 850 for the input of data, including hard and soft buttons, a joystick, a mouse or other pointing device, a keyboard, voice command system, or gesture recognition system. In one embodiment, the computing system 800 includes one or more depth cameras/scanners 852 to capture data used for image processing, including 3D data. The depth cameras/scanners can include RGB-D (red, green, blue, depth) sensors, and Lidar (Light Detection and Ranging) remote scanners.

In some embodiments, computing system 800 includes an output display 855, where the output display 855 may include a liquid crystal display (LCD) or any other display technology, for displaying information or content to a user. In some environments, the output display 855 may include a touch-screen that is also utilized as at least a part of an input device 850. Output display 855 may further include audio output, including one or more speakers, audio output jacks, or other audio, and other output to the user.

The computing system 800 may also comprise a battery or other power source 860, which may include a solar cell, a fuel cell, a charged capacitor, near field inductive coupling, or other system or device for providing or generating power in the computing system 800. The power provided by the power source 860 may be distributed as required to elements of the computing system 800.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 815 or the non-volatile memory 820 or a combination of such memories, and each of these memories is a form of a machine readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus, the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus, processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application, including SRAM that is coupled near to the one or more processor(s) and accelerator(s), referred to as "near memory," to minimize latency when transmitting data between the processing elements and the SRAM. The term "memory" can also be intended to encompass a register file (RF) of processor registers in the one or more processor(s), where the RF is typically implemented as a fast SRAM with multiple ports for transmitting data to and from near memory with minimized latency.

Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

Additional example implementations are as follows:

Example 1 is a method, system, apparatus or computer-readable medium for an integrated circuit comprising a near memory coupled to circuitry to accelerate a convolution, the near memory to store a filter row of a filter having one or more channels, the filter row to be stored in the near memory in a channel-wise order along with the one or more channels of a same filter row of the filter. The circuitry is to select a weight from the filter row to be stored contiguously in the near memory and access input activations from an input buffer based on a stride input and a position of the weight selected from the filter row. At least one array of multiply and accumulate (MAC) units coupled to the circuitry is to compute, from the weight and the input activations, a partial sum for the convolution.

Example 2 is the method, system, apparatus or computer-readable medium of Example 1 wherein the stride input is a number applied in the circuitry to shift access to an input row of input activations streamed to the input buffer by positions of the input buffer equal to the number and the position of the weight is relative to positions of neighboring weights of the filter row from which the weight was selected.

Example 3 is the method, system, apparatus or computer-readable medium of Example 1, further wherein the input activations are streamed to the input buffer, row by row, in a same channel-wise order as the channel-wise order used to store the filter row and the one or more channels of the same filter row in the near memory.

Example 4 is the method, system, apparatus or computer-readable medium of Example 2, further comprising an output buffer to store the partial sum computed by the at least one array of MAC units.

Example 5 is the method, system, apparatus or computer-readable medium of Example 4, wherein a width of the output buffer is coordinated with a width input buffer, the width of the output buffer equal to a number of the MAC units in the at least one array of MAC units.

Example 6 is the method, system, apparatus or computer-readable medium of Example 3, wherein the near memory, the circuitry and the at least one array of MAC units comprise a compute near memory (CNM) accelerator, and the circuitry includes a multiplexer circuit to select the weight from the filter row and a multiplexer array to access the input activations from the input buffer based on the stride input and the position of the weight selected from the filter row.

Example 7 is the method, system, apparatus or computer-readable medium of Example 6, further comprising a systolic array of CNM accelerators arranged to accumulate partial sums computed by the respective arrays of MAC units into an output feature map representing the convolution.

Example 8 is the method, system, apparatus or computer-readable medium of Example 7, wherein the input activations are streamed to the input buffer in each CNM accelerator in the systolic array of CNM accelerators, row by row, in the same channel-wise order as the channel-wise order used to store the filter row and the one or more channels of the same filter row in the near memory.

Example 9 is the method, system, apparatus or computer-readable medium of Example 7, wherein the filter row and the one or more channels of the same filter row are distributed to the systolic array of CNM accelerators in row-wise order, the distributed filter rows to be stored in the near memory contiguously in the channel-wise order.

Example 10 is the method, system, apparatus or computer-readable medium of Example 1, wherein the near memory includes any of a static random access memory (SRAM) and a register file (RF).

Example 11 is a computer-implemented method, system, apparatus or computer-readable medium for accelerating a convolutional neural network (CNN) comprising a processor coupled to an accelerator circuitry. In the accelerator circuitry, filter rows of a filter are distributed, in row-wise order to modules of the accelerator circuitry, the filter having multiple channels containing weights for convolving a convolution layer of the CNN. The accelerator circuitry is configured for selecting, from a near memory coupled to a module of the accelerator circuitry, a weight from a filter row distributed to the module and stored in the near memory, accessing, from an input buffer coupled to the module of the accelerator circuitry, input activations of an input activation row of the convolution layer based on a position of the weight selected from the filter row, and convolving, in at least one array of MAC units coupled to the module of the accelerator circuitry, the input activations with the weight selected from the filter row to generate a partial sum.

Example 12 is a computer-implemented method, system, apparatus or computer-readable medium of Example 11, where the accelerator circuitry is further configured for receiving, in a stride control circuit coupled to the module of the accelerator circuitry, a stride by amount and accessing the input activations from the input buffer based on the stride by amount and the position of the weight as applied to the input buffer by the stride control circuit.

Example 13 is a computer-implemented method, system, apparatus or computer-readable medium of Example 11, wherein the position of the weight is relative to positions of neighboring weights of the filter row from which the weight was selected.

Example 14 is a computer-implemented method, system, apparatus or computer-readable medium of Example 11 wherein, for each module of the accelerator circuitry to which the filter rows were distributed, the filter rows are stored contiguously in the near memory in channel-wise order and the input activation rows are streamed to the input buffer in channel-wise order.

Example 15 is a computer-implemented method, system, apparatus or computer-readable medium of Example 11, where the accelerator circuitry is further configured for arranging the modules of the accelerator circuitry into a systolic array and assembling partial sums generated in the at least one array of MAC units coupled to each module into an output feature map for the convolution layer.

Example 16 is a computer-implemented method, system, apparatus or computer-readable medium of Example 11, wherein the near memory includes any of a static random access memory (SRAM) and a register file (RF).

Example 17 is a computer-implemented method, system, apparatus or computer-readable medium of Example 12, wherein each module of the accelerator circuitry includes a mux selector for selecting the weight from the filter row and the stride control circuit includes a mux array.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

In the foregoing specification, embodiments have been described with reference to specific exemplary embodiments or implementations. It will be evident that various modifications could be made to the described embodiments or implementations without departing from the broader spirit and scope of the embodiments or implementations as set forth in the following claims. The specification and drawings are, accordingly, to be regarded in an illustrative sense rather than a restrictive sense.

What is claimed is:

1. An integrated circuit comprising:
    a memory to store one or more channels of a same filter row of a filter, each channel of the same filter row to be stored contiguously in the memory, row by row, in a channel-wise order;
    an input buffer to receive one or more channels of input row vectors of input activations streamed to the input buffer, row by row, in the channel-wise order;
    circuitry, including:
        a multiplexer circuit to select a selected weight from a stored filter row, and
        a multiplexer array to access the input activations from the input buffer based on a stride input and a weight position of the selected weight; and
    at least one array of multiply and accumulate (MAC) units coupled to the circuitry, the at least one array of MAC units to compute, from the selected weight and the input activations, a partial sum for a convolution; and
    wherein the circuitry enables access to the memory and the input buffer by the at least one array of MAC units to accelerate the convolution.

2. The integrated circuit of claim 1, wherein:
    the stride input is a number applied in the circuitry to shift access to an input row vector of the input activations streamed to the input buffer by buffer positions of the input buffer equal to the number; and
    the weight position is relative to weight positions of neighboring weights of the stored filter row from which the selected weight was selected.

3. The integrated circuit of claim 2, further comprising an output buffer to store the partial sum computed by the at least one array of MAC units.

4. The integrated circuit of claim 3, wherein a width of the output buffer is coordinated with a width of the input buffer, the width of the output buffer equal to a number of the MAC units in the at least one array of MAC units.

5. The integrated circuit of claim 1, wherein the circuitry and the at least one array of MAC units comprise a compute near memory (CNM) circuit block of a CNM accelerator, the integrated circuit further comprising a systolic array of CNM circuit blocks arranged to accumulate partial sums computed by respective arrays of MAC units in the systolic array of CNM circuit blocks into an output feature map representing the convolution.

6. The integrated circuit of claim 5, wherein the one or more channels of input row vectors of input activations streamed to the input buffer are reused in each CNM circuit block in the systolic array of CNM circuit blocks, row by row, in the channel-wise order.

7. The integrated circuit of claim 5, wherein one or more channels of same filter rows are distributed to the systolic array of CNM circuit blocks in row-wise order, the distributed filter rows to be stored contiguously in the memory of each CNM circuit block, row by row, in the channel-wise order.

8. The integrated circuit of claim 1, wherein the memory includes any of a static random access memory (SRAM) and a register file (RF).

\* \* \* \* \*